(12) United States Patent
Tanizaki et al.

(10) Patent No.: US 6,265,083 B1
(45) Date of Patent: Jul. 24, 2001

(54) POLY (4-METHYL-1-PENTENE) RESIN LAMINATES AND USES THEREOF

(75) Inventors: Tatsuya Tanizaki; Takashi Nakahara; Mineo Kubo, all of Yamaguchi (JP)

(73) Assignee: Mitsui Chemicals, Inc., Tokyo (JP)

(*) Notice: Subject to any disclaimer, the term of this patent is extended or adjusted under 35 U.S.C. 154(b) by 0 days.

(21) Appl. No.: 09/147,961

(22) PCT Filed: Aug. 21, 1998

(86) PCT No.: PCT/JP98/03708
§ 371 Date: Mar. 24, 1999
§ 102(e) Date: Mar. 24, 1999

(87) PCT Pub. No.: WO99/10171
PCT Pub. Date: Mar. 4, 1999

(30) Foreign Application Priority Data

Aug. 22, 1997 (JP) .................................................. 9-226151
Jan. 12, 1998 (JP) .................................................. 10-004025

(51) Int. Cl.[7] .............................................................. B32B 27/32
(52) U.S. Cl. ................................................ 428/515; 428/516
(58) Field of Search ......................................... 428/515, 516

(56) References Cited

U.S. PATENT DOCUMENTS

| | | | |
|---|---|---|---|
| 4,988,558 | * 1/1991 | Shigemoto | 428/213 |
| 5,106,692 | * 4/1992 | Shigemoto | 428/412 |
| 5,484,654 | * 1/1996 | Mueller | 428/332 |
| 5,973,077 | * 10/1999 | Kan et al. | 525/240 |
| 5,976,651 | * 11/1999 | Tatsumi et al. | 428/35.7 |

FOREIGN PATENT DOCUMENTS

| | | |
|---|---|---|
| 61-29540 | 2/1986 | (JP) . |
| 63-295252 | 12/1988 | (JP) . |
| 1304937 | 12/1989 | (JP) . |
| 2107438 | 4/1990 | (JP) . |
| 2155718 | 6/1990 | (JP) . |
| 2155736 | 6/1990 | (JP) . |
| 5168398 | 7/1993 | (JP) . |
| 5260892 | 10/1993 | (JP) . |
| 6-22686 | 2/1994 | (JP) . |
| 760921 | 3/1995 | (JP) . |
| 7264975 | 10/1995 | (JP) . |
| 81880 | 1/1996 | (JP) . |
| 9-011417 | * 1/1997 | (JP) . |
| 9-268243 | * 10/1997 | (JP) . |

* cited by examiner

Primary Examiner—Paul Thibodeau
Assistant Examiner—D. Lawrence Tarazano
(74) Attorney, Agent, or Firm—Birch, Stewart, Kolasch & Birch, LLP

(57) ABSTRACT

A poly-4-methyl-1-pentene resin laminate excellent in not only heat sealing properties and oxygen gas permeability but also blocking resistance is provided. The poly-4-methyl-1-pentene resin laminate comprises a layer made of a 4-methyl-1-pentene polymer (A), an intermediate layer made of an adhesive resin composition (B) and a layer made of a propylene polymer composition (C) comprising 60 to 90 parts by weight of a propylene polymer (c-1) and 10 to 40 parts by weight of a 1-butene polymer (c-2), the total amount of said components (c-1) and (c-2) being 100 parts by weight. This poly-4-methyl-1-pentene resin laminate can be used as a material of freshness-keeping packaging media and culture containers. Also provided is a poly-4-methyl-1-pentene resin laminate having excellent peel resistance and capable of being easily controlled in the oxygen gas permeability. This poly-4-methyl-1-pentene resin laminate comprises a layer made of a 4-methyl-1-pentene polymer (A'), an intermediate layer made of an adhesive resin composition (B') and a layer made of an olefin polymer (C'). This poly-4-methyl-1-pentene resin laminate can be used as a material of containers for keeping freshness of vegetables and fruits.

4 Claims, No Drawings

# POLY (4-METHYL-1-PENTENE) RESIN LAMINATES AND USES THEREOF

This application is the national phase under 35 U.S.C. §371 of PCT International Application No. PCT/JP98/03708 which has an International filing date of Aug. 21, 1998 which designated the United States of America.

TECHNICAL FIELD

The present invention relates to poly-4-methyl-1-pentene resin laminates. More particularly, the invention relates to poly-4-methyl-1-pentene laminates having excellent gas permeability, heat sealing properties and blocking resistance, poly-4-methyl-1-pentene resin laminates capable of being easily controlled in the gas permeability and packaging media formed from the laminates.

BACKGROUND ART

Because of their excellent heat resistance, transparency, gas permeability and mold release characteristics, 4-methyl-1-pentene polymers have been employed for, for example, plates for electronic oven, release films for FPC, process paper for artificial leather, baking cartons, medical syringes, storage containers of medicines, agricultural chemicals, cosmetics, blood or the like, measuring equipment, and storage containers of perishable foods. The 4-methyl-1-pentene polymers, however, have poor heat sealing strength, and they have been desired to be further improved in the practical performance.

In order to impart heat sealing properties to the 4-methyl-1-pentene polymers, a method of laminating the 4-methyl-1-pentene polymers to other thermoplastic resins such as polyolefins has been studied. However, if the 4-methyl-1-pentene polymers are laminated to other thermoplastic resins, the gas permeability that is an excellent property inherent in the 4-methyl-1-pentene polymers is deteriorated. In addition, the 4-methyl-1-pentene polymers have a problem of low adhesion strength.

Under such circumstances as mentioned above, the present inventors have earnestly studied, and as a result, they have found that a laminate consisting of a layer of a 4-methyl-1-pentene polymer, an intermediate layer of an adhesive resin composition and a layer of a specific propylene polymer composition is excellent in not only heat sealing properties and gas permeability but also blocking resistance. Based on the finding, the present invention has been accomplished.

The present inventors have further found that a laminate consisting of a layer of a 4-methyl-1-pentene polymer, an intermediate layer of a specific adhesive resin composition and a layer of an olefin polymer is favorable for storage of vegetables and fruits.

It has been hitherto known that vegetables and fruits are packaged with packaging media to prevent rotting or deterioration or to keep freshness. For example, vegetables such as lettuce, sweet pepper, broccoli, asparagus, spinach and mushroom, or fruits such as peach are packaged with packaging media made of polypropylene, low-density polyethylene, polybutadiene and the like to keep freshness. However, it is particularly difficult to keep freshness of vegetables and fruits having high respiration rates, such as broccoli and asparagus, so that development of packaging media capable of keeping freshness for a long period of time has been desired.

It is generally said that use of packaging media having excellent gas permeability is desirable to keep freshness of vegetables and fruits having high respiration rates. In order to increase gas permeability of the packaging media, a method of thinning the packaging media can be thought, but if the packaging media are thinned, it becomes difficult to maintain strength appropriate for packaging media. Further, there is a limit to the thickness of the packaging media because production of thin packaging media is accompanied by technical difficulty. A method of incorporating a filler into a resin to increase gas permeability of the packaging media can also be thought, but there resides a problem of occurrence of pinholes in this method. In Japanese Patent Laid-Open Publications No. 168398/1993, No. 260892/1993, No. 22686/1994 and No. 264975/1995, a method of opening fine holes in the packaging media to increase gas permeability is described. This method, however, is undesirable from the hygienic viewpoint because there is a possibility of entering of bacteria through the holes.

On the other hand, it is said that vegetables and fruits having low respiration rates are desired to be packaged with packaging media having low gas permeability to keep freshness.

Thus, as materials of the packaging media for keeping freshness of vegetables and fruits, those having gas permeability corresponding to the respiration rate should be employed. In the prior art, however, it was difficult to control gas permeability of the packaging media over a wide range of high permeability to low permeability.

Under such circumstances as mentioned above, the present inventors have earnestly studied, and as a result, they have found that a laminate consisting of a layer of a 4-methyl-1-pentene polymer, an intermediate layer of a specific adhesive resin composition and a layer of an olefin polymer has excellent peel resistance and can be easily controlled in the gas permeability. Based on the finding, the present invention has been accomplished.

DISCLOSURE OF THE INVENTION

One embodiment of the poly-4-methyl-1-pentene resin laminate according to the invention comprises:

(I) a layer made of a 4-methyl-1-pentene polymer (A), (II) an intermediate layer made of an adhesive resin composition (B), and (III) a layer made of a propylene polymer composition (C) comprising 60 to 90 parts by weight of a propylene polymer (c-1) and 10 to 40 parts by weight of a 1-butene polymer (c-2), the total amount of said components (c-1) and (c-2) being 100 parts by weight.

Another embodiment of the poly-4-methyl-1-pentene resin laminate according to the invention comprises:

(I) a layer made of a 4-methyl-1-pentene polymer (A), (II) an intermediate layer made of an adhesive resin composition (B), and (III) a layer made of a propylene polymer composition (C) comprising 60 to 90 parts by weight of a propylene polymer (c-1) and 10 to 40 parts by weight of a propylene/ethylene copolymer (c-3), the total amount of said components (c-1) and (c-3) being 100 parts by weight.

In the present invention, the 4-methyl-1-pentene polymer (A) is preferably a 4-methyl-1-pentene homopolymer or a 4-methyl-1-pentene copolymer containing constituent units derived from 4-methyl-1-pentene in amounts of not less than 85% by weight, and the adhesive resin composition (B) is preferably a composition comprising a 4-methyl-1-pentene polymer (b-1) and a 1-butene polymer (b-2) and containing the 4-methyl-1-pentene polymer (b-1) in an amount of 40 to 70 parts by weight and the 1-butene polymer (b-2) in an amount of 30 to 60 parts by weight, the total amount of said components (b-1) and (b-2) being 100 parts by weight.

The poly-4-methyl-1-pentene resin laminates mentioned above have excellent gas permeability and heat sealing properties.

A further embodiment of the poly-4-methyl-1-pentene resin laminate according to the invention comprises:

(I) a layer made of a 4-methyl-1-pentene polymer (A'), (II) an intermediate layer made of an adhesive resin composition (B'), and (III) a layer made of an olefin polymer (C').

The 4-methyl-1-pentene resin laminate of the above embodiment includes the following laminates:

(1) a laminate wherein the adhesive resin composition (B') is a composition comprising a 4-methyl-1-pentene polymer (b-1) and a 1-butene polymer (b-2);

(2) a laminate wherein the adhesive resin composition (B') is a composition comprising a 4-methyl-1-pentene polymer (b-1) and a 1-butene polymer (b-2) and containing the 4-methyl-1-pentene polymer (b-1) in an amount of 40 to 97.5 parts by weight and the 1-butene polymer (b-2) in an amount of 2.5 to 60 parts by weight, the total amount of said components (b-1) and (b-2) being 100 parts by weight;

(3) a laminate wherein the olefin polymer (C') is a propylene polymer (c-4) and the adhesive resin composition (B') is a composition comprising a 4-methyl-1-pentene polymer (b-1) and a 1-butene polymer (b-2) and containing the 4-methyl-1-pentene polymer (b-1) in an amount of 40 to 97.5 parts by weight and the 1-butene polymer (b-2) in an amount of 2.5 to 60 parts by weight, the total amount of said components (b-1) and (b-2) being 100 parts by weight;

(4) a laminate wherein the adhesive resin composition (B') is a composition comprising a 4-methyl-1-pentene polymer (b-1), a 1-butene polymer (b-2) and a propylene polymer (b-3);

(5) a laminate wherein the adhesive resin composition (B') is a composition comprising a 4-methyl-1-pentene polymer (b-1), a 1-butene polymer (b-2) and a propylene polymer (b-3), containing the 4-methyl-1-pentene polymer (b-1) in an amount of 40 to 97.5 parts by weight and the 1-butene polymer (b-2) in an amount of 2.5 to 60 parts by weight, the total amount of said components (b-1) and (b-2) being 100 parts by weight, and containing the propylene polymer (b-3) in an amount of 1 to 100 parts by weight based on 100 parts by weight of the total amount of the components (b-1) and (b-2);

(6) a laminate wherein the olefin polymer (C') is a propylene polymer (c-4) and the adhesive resin composition (B') is a composition comprising a 4-methyl-1-pentene polymer (b-1), a 1-butene polymer (b-2) and a propylene polymer (b-3), containing the 4-methyl-1-pentene polymer (b-1) in an amount of 40 to 97.5 parts by weight and the 1-butene polymer (b-2) in an amount of 2.5 to 60 parts by weight, the total amount of said components (b-1) and (b-2) being 100 parts by weight, and containing the propylene polymer (b-3) in an amount of 1 to 100 parts by weight based on 100 parts by weight of the total amount of the components (b-1) and (b-2); and (7) a laminate wherein the olefin polymer (C') is an ethylene polymer (c-5) and the adhesive resin composition (B') is a composition comprising a 4-methyl-1-pentene polymer (b-1), a 1-butene polymer (b-2), an ethylene/butene copolymer (b-4), and optionally, a propylene/butene copolymer (b-5) and containing the 4-methyl-1-pentene polymer (b-1) in an amount of 20 to 60 parts by weight, the 1-butene polymer (b-2) in an amount of 5 to 40 parts by weight, the ethylene/butene copolymer (b-4) in an amount of 30 to 60 parts by weight and the propylene/butene copolymer (b-5) in an amount of 0 to 30 parts by weight, the total amount of said components (b-1), (b-2), (b-4) and (b-5) being 100 parts by weight.

The poly-4-methyl-1-pentene resin laminates mentioned above are capable of being controlled in the gas permeability such as oxygen permeability over a wide range of high permeability to low permeability, and they can be used as materials of packaging media for keeping freshness of vegetables and fruits.

BEST MODE FOR CARRYING OUT THE INVENTION

The poly-4-methyl-1-pentene resin laminate of the invention is described in detail hereinafter.

The poly-4-methyl-1-pentene resin laminate of the invention is constituted of a layer made of a 4-methyl-1-pentene polymer (A), an intermediate layer made of an adhesive resin composition (B) and a layer made of a propylene polymer composition (C). First, the resins for forming the layers of the poly-4-methyl-1-pentene resin laminate are described.

4-Methyl-1-pentene Polymer (A)

Examples of the 4-methyl-1-pentene polymers for use in the invention include a homopolymer of 4-methyl-1-pentene and copolymers of 4-methyl-1-pentene and α-olefins of 2 to 20 carbon atoms other than 4-methyl-1-pentene.

Examples of the α-olefins of 2 to 20 carbon atoms other than 4-methyl-1-pentene include ethylene, propylene, 1-butene, 1-hexene, 1-octene, 1-decene, 1-tetradecene, 1-octadecene, 1-hexadecene, 1-dodecene, 1-tetradecene and 1-eicosene. These α-olefins can be used singly or in combination of two or more kinds. Of these, 1-hexene is preferable in view of copolymerizability.

In the 4-methyl-1-pentene polymer, it is desirable that the units derived from 4-methyl-1-pentene are present in amounts of 85 to 100% by mol, preferably 90 to 98% by mol, and the units derived from other α-olefins are present in amounts of 0 to 15% by mol, preferably 2 to 10% by mol. When the content of the units derived from 4-methyl-1-pentene and the content of the units derived from other α-olefins are in the above ranges, the 4-methyl-1-pentene polymer has excellent gas permeability and mechanical strength.

The 4-methyl-1-pentene polymer (A) desirably has a melt flow rate (MFR), as measured under the conditions of a temperature of 260° C. and a load of 5.0 kg in accordance with the method of ASTM D1238, of 0.1 to 200 g/10 min, preferably 1.0 to 150 g/10 min.

There is no specific limitation on the process for preparing the 4-methyl-1-pentene polymer, and the 4-methyl-1-pentene polymer can be prepared by a conventional process, for example, a process using a Ziegler Natta catalyst or a cationic polymerization process.

Adhesive Resin Composition (B)

The adhesive resin composition (B) for use in the invention is a composition consisting of at least two different resins. There is no specific limitation on the adhesive resin composition, and any composition is employable as far as the layer of the 4-methyl-1-pentene polymer (A) and the layer of the later-described propylene polymer composition (C) can be bonded with the adhesive resin composition, but preferable is a composition comprising a 4-methyl-1-pentene polymer (b-1) and a 1-butene polymer (b-2).

Examples of the 4-methyl-1-pentene polymers (b-1) employable herein include those previously described with respect to the 4-methyl-1-pentene polymer (A).

In the 4-methyl-1-pentene polymer (b-1), however, the α-olefin other than 4-methyl-1-pentene is preferably 1-decene, 1-dodecene, 1-tetradecene, 1-hexadecene, 1-octadecene, 1-hexene or 1-eicosene.

In the 4-methyl-1-pentene polymer (b-1), the content of the units derived from 4-methyl-1-pentene is preferably in the range of 80 to 100% by mol, and the content of the units derived from other α-olefins is preferably in the range of 0 to 20% by mol. From the viewpoint of adhesion properties of the resulting adhesive resin composition, the 4-methyl-1-pentene polymer is preferably a copolymer, and in this case, the content of the units derived from 4-methyl-1-pentene is preferably in the range of 80 to 99.9% by mol, and the content of the units derived from other α-olefins is preferably in the range of 0.1 to 20% by mol.

The 1-butene polymer (b-2) is a homopolymer of 1-butene or a copolymer of 1-butene and an α-olefin other than 1-butene wherein the constituent units derived from 1-butene are contained in amounts of not less than 60% by weight. Particularly, the 1-butene polymer (b-2) containing constituent units derived from 1-butene in amounts of not less than 80% by weight has excellent compatibility with the 4-methyl-1-pentene polymer (b-1).

Examples of the α-olefins other than 1-butene include α-olefins of 2 to 20 carbon atoms other than 1-butene, such as ethylene, propylene, 1-hexene, 1-octene, 1-decene, 1-tetradecene and 1-octadecene. These α-olefins can be used singly or in combination of two or more kinds. Of these, preferable are ethylene and propylene.

The 1-butene polymer (b-2) desirably has MFR, as measured under the conditions of a temperature of 190° C. and a load of 2.16 kg in accordance with the method of ASTM D1238, of 0.01 to 100 g/10 min, preferably 0.1 to 50 g/10 min. When MFR of the 1-butene polymer (b-2) is in the above range, the 1-butene polymer (b-2) shows good blending properties with the 4-methyl-1-pentene polymer (b-1), and hence the adhesive resin composition (B) exhibits high adhesion properties.

It is preferable that the adhesive resin composition (B) for use in the invention comprises the 4-methyl-1-pentene polymer (b-1) and the 1-butene polymer (b-2) and contains the 4-methyl-1-pentene polymer (b-1) in an amount of 40 to 70 parts by weight and the 1-butene polymer (b-2) in an amount of 30 to 60 parts by weight, the total amount of said components (b-1) and (b-2) being 100 parts by weight. From the viewpoint of adhesion strength, it is more preferable that the adhesive resin composition (B) contains the 4-methyl-1-pentene polymer (b-1) in an amount of 45 to 65 parts by weight and the 1-butene polymer (b-2) in an amount of 35 to 55 parts by weight, the total amount of said components (b-1) and (b-2) being 100 parts by weight.

The adhesive resin composition (B) desirably has MFR, as measured under the conditions of a temperature of 190° C. and a load of 5.0 kg in accordance with the method of ASTM D1238, of 0.1 to 200 g/10 min, preferably 1.0 to 100 g/10 min. When MFR of the adhesive resin composition (B) is in the above range, the adhesive resin composition (B) exhibits high adhesion properties to both of the layer of the 4-methyl-1-pentene polymer (A) and the layer of the propylene polymer composition (C).

The adhesive resin composition (B) can be prepared by mixing the 4-methyl-1-pentene polymer (b-1) with the 1-butene polymer (b-2) by a conventional method and then melt kneading the mixture. For example, the components (b-1) and (b-2) in given amounts are mixed by a V-type blender, a ribbon blender, a Henschel mixer, a tumbling blender or the like. Then, the mixture is melt kneaded by a single screw extruder, a multiple screw extruder or the like and granulated, or the mixture is melt kneaded by a kneader, a Banbury mixer or the like and pulverized.

The adhesive resin composition (B) may contain various compounding additives generally added to polyolefins, such as silane coupling agent, weathering stabilizer, heat stabilizer, slip agent, nucleating agent and dye.

Propylene Polymer Composition (C)

The propylene polymer composition (C) for use in the invention is a composition comprising a propylene polymer (c-1) and a 1-butene polymer (c-2) or a composition comprising a propylene polymer (c-1) and a propylene/ethylene copolymer (c-3).

Examples of the propylene polymers (c-1) include:
a homopolymer of propylene,
a propylene random copolymer (e.g., a propylene/ethylene random copolymer, a propylene/ethylene/1-butene random copolymer or a propylene/1-butene random copolymer) containing constituent units derived from propylene in amounts of not less than 90% by mol, preferably not less than 95% by mol, and
a propylene/ethylene block copolymer containing constituent units derived from ethylene in amounts of 5 to 30% by mol.

The propylene polymer (c-1) desirably has MFR, as measured under the conditions of a temperature of 230° C. and a load of 2.16 kg in accordance with the method of ASTM D1238, of 0.01 to 100 g/10 min, preferably 0.1 to 50 g/10 min. When MFR of the propylene polymer (c-1) is in the above range, the propylene polymer (c-1) shows good blending properties with the 1-butene polymer (c-2) or the propylene/ethylene copolymer (c-3).

The 1-butene polymer (c-2) is a homopolymer of 1-butene or a copolymer of 1-butene and an α-olefin other than 1-butene wherein the constituent units derived from 1-butene are contained in amounts of not less than 60% by weight. Particularly, the 1-butene polymer (c-2) containing constituent units derived from 1-butene in amounts of not less than 80% by weight has excellent compatibility with the propylene polymer (c-1).

Examples of the α-olefins other than 1-butene include α-olefins of 2 to 20 carbon atoms other than 1-butene, such as ethylene, propylene, 1-hexene, 1-octene, 1-decene, 1-tetradecene and 1-octadecene. These α-olefins can be used singly or in combination of two or more kinds. Of these, preferable are ethylene and propylene.

The 1-butene polymer (c-2) desirably has MFR, as measured under the conditions of a temperature of 190° C. and a load of 2.16 kg in accordance with the method of ASTM D1238, of 0.01 to 100 g/10 min, preferably 0.1 to 50 g/10 min. When MFR of the 1-butene polymer (c-2) is in the above range, the 1-butene polymer (c-2) shows good blending properties with the propylene polymer (c-1).

The propylene/ethylene copolymer (c-3) is a propylene/ethylene random copolymer containing constituent units derived from propylene in amounts of 50 to 90% by weight. Especially when the constituent units derived from propylene are contained in amounts of 60 to 85% by weight, the resin laminate exhibits excellent mechanical strength. The propylene/ethylene copolymer (c-3) may further contain constituent units derived from other olefins such as olefins of 4 to 20 carbon atoms.

The propylene/ethylene copolymer (c-3) desirably has MFR, as measured under the conditions of a temperature of 230° C. and a load of 2.16 kg in accordance with the method of ASTM D1238, of 0.1 to 200 g/10 min, preferably 1.0 to 100 g/10 min. When MFR of the propylene/ethylene copolymer (c-3) is in the above range, the propylene/ethylene copolymer (c-3) shows good blending properties with the propylene polymer (c-1).

It is preferable that the propylene polymer composition (C) for use in the invention comprises the propylene polymer (c-1) and the 1-butene polymer (c-2) and contains the propylene polymer (c-1) in an amount of 60 to 90 parts by weight and the 1-butene polymer (c-2) in an amount of 10 to 40 parts by weight, the total amount of said components (c-1) and (c-2) being 100 parts by weight.

In this case, it is more preferable in view of balance between heat sealing strength and gas permeability that the propylene polymer composition (C) contains the propylene polymer (c-1) in an amount of 60 to 80 parts by weight and the 1-butene polymer (c-2) in an amount of 20 to 40 parts by weight, the total amount of said components (c-1) and (c-2) being 100 parts by weight.

It is also preferable that the propylene polymer composition (C) for use in the invention comprises the propylene polymer (c-1) and the propylene/ethylene copolymer (c-3) and contains the propylene polymer (c-1) in an amount of 60 to 90 parts by weight and the propylene/ethylene copolymer (c-3) in an amount of 10 to 40 parts by weight, the total amount of said components (c-1) and (c-3) being 100 parts by weight.

In this case, it is more preferable in view of balance between heat sealing strength and gas permeability that the propylene polymer composition (C) contains the propylene polymer (c-1) in an amount of 60 to 80 parts by weight and the propylene/ethylene copolymer (c-3) in an amount of 20 to 40 parts by weight, the total amount of said components (c-1) and (c-3) being 100 parts by weight.

The propylene polymer composition (C) can be prepared by mixing the propylene polymer (c-1) with the 1-butene polymer (c-2) or mixing the propylene polymer (c-1) with the propylene/ethylene copolymer (c-3) by a conventional method and then melt kneading the mixture. For example, the components (c-1) and (c-2) or the components (c-1) and the (c-3) in given amounts are mixed by a V-type blender, a ribbon blender, a Henschel mixer, a tumbling blender or the like. Then, the mixture is melt kneaded by a single screw extruder, a multiple screw extruder or the like and granulated, or the mixture is melt kneaded by a kneader, a Banbury mixer or the like and pulverized.

The propylene polymer composition (C) may contain various compounding additives generally added to polyolefins, such as silane coupling agent, weathering stabilizer, heat stabilizer, slip agent, nucleating agent and dye.

The poly-4-methyl-1-pentene resin laminate of the invention is constituted of a layer made of the 4-methyl-1-pentene polymer (A), an intermediate layer made of the adhesive resin composition (B) and a layer made of the propylene polymer composition (C).

Although there is no specific limitation on the thickness ratio between the layers for forming the laminate, the thickness ratio between the layer of the 4-methyl-1-pentene polymer (A), the intermediate layer of the adhesive resin composition (B) and the layer of the propylene polymer composition (C) is usually 1–100:1–100:1–100, preferably 50–100:1–50:1–50.

Likewise, there is no specific limitation on the thickness of the laminate, and the thickness thereof can be appropriately determined according to the shape, size and use application of the laminate. The thickness of the laminate is in the range of usually about 0.01 to 2.0 mm, preferably about 0.02 to 0.5 mm.

The poly-4-methyl-1-pentene resin laminate of the invention can be prepared by, for example, co-extrusion molding of the 4-methyl-1-pentene polymer (A), the adhesive resin composition (B) and the propylene polymer composition (C), or press molding of sheets or films produced in advance from the resins (compositions) by press molding, extrusion molding or the like.

The poly-4-methyl-1-pentene resin laminate has excellent gas permeability, heat sealing properties and blocking resistance, so that it can be favorably used for freshness-keeping packaging media and culture containers requiring oxygen permeability, resistance to heat of heat sterilization and heat sealing properties. Further, the poly-4-methyl-1-pentene resin laminate is free from blocking even when exposed to a temperature of about 120° C., so that it can be subjected to heat sterilization.

Next, the other embodiment of the poly-4-methyl-1-pentene resin laminate of the invention is described.

The other embodiment of the poly-4-methyl-1-pentene resin laminate of the invention is constituted of:

(I) a layer made of a 4-methyl-1-pentene polymer (A'), (II) an intermediate layer made of an adhesive resin composition (B'), and (III) a layer made of an olefin polymer (C').

First, the resins for forming the layers of the poly-4-methyl-1-pentene resin laminate of the invention are described.

4-Methyl-1-pentene Polymer (A')

Examples of the 4-methyl-1-pentene polymers include a homopolymer of 4-methyl-1-pentene and copolymers of 4-methyl-1-pentene and α-olefins of 2 to 24 carbon atoms other than 4-methyl-1-pentene.

Examples of the α-olefins of 2 to 24 carbon atoms other than 4-methyl-1-pentene include ethylene, propylene, 1-butene, 1-hexene, 1-octene, 1-decene, 1-tetradecene, 1-octadecene, 1-hexadecene, 1-dodecene and 1-tetradecene. These α-olefins can be used singly or in combination of two or more kinds. Of these, 1-hexene is preferable in view of copolymerizability.

In the 4-methyl-1-pentene polymer, it is desirable that the units derived from 4-methyl-1-pentene are present in amounts of 80 to 100% by mol, preferably 85 to 98% by mol, and the units derived from other α-olefins are present in amounts of 0 to 20% by mol, preferably 2 to 15% by mol. When the content of the units derived from 4-methyl-1-pentene and the content of the units derived from other α-olefins are in the above ranges, the 4-methyl-1-pentene polymer has excellent gas permeability and mechanical strength.

The 4-methyl-1-pentene polymer (A') desirably has MFR, as measured under the conditions of a temperature of 260° C. and a load of 5.0 kg in accordance with the method of ASTM D1238, of 0.1 to 200 g/10 min, preferably 1.0 to 150 g/10 min.

There is no specific limitation on the process for preparing the 4-methyl-1-pentene polymer, and the 4-methyl-1-pentene polymer can be prepared by a conventional process, for example, a process using a Ziegler Natta catalyst or a cationic polymerization process.

The 4-methyl-1-pentene polymer (A') may be graft modified with modification monomers. The modified 4-methyl- 1-pentene polymer is preferable because films having excellent adhesion properties and sheet-forming properties can be obtained therefrom.

Examples of the modification monomers include unsaturated carboxylic acids, such as (meth)acrylic acid, maleic acid, fumaric acid, tetrahydrofumaric acid, itaconic acid, citraconic acid, crotonic acid, isocrotonic acid and endo-cis-bicyclo[2.2.1]hept-5-ene-2,3-dicarboxylic acid (Nadic acid™); and derivatives of these acids, such as acid halides, acid amides, acid imides, acid anhydrides and esters thereof. Particular examples of the derivatives include alkyl esters of (meth)acrylic acid, such as malenyl chloride, maleimide, maleic anhydride, citraconic anhydride, dimethyl maleate, glycidyl maleate, methyl (meth)acrylate and ethyl (meth)acrylate. These modification monomers can be used singly or in combination of two or more kinds. Of these, preferable are unsaturated dicarboxylic acids and anhydrides thereof. Particularly preferable are maleic acid, Nadic acid™ and anhydrides thereof.

The content (graft quantity) of the modification monomer in the modified 4-methyl-1-pentene polymer is in the range of usually 0.1 to 20% by weight, preferably 0.5 to 5% by weight.

The 4-methyl-1-pentene polymer can be modified by, for example, heating the 4-methyl-1-pentene polymer and the modification monomer to a temperature of 100 to 300° C., preferably 125 to 250° C., in a solvent in the presence of a polymerization initiator, or kneading the methyl-1-pentene polymer with the modification monomer at a temperature of 235 to 250° C. by an extruder in the presence of a polymerization initiator using no solvent.

The polymerization initiator is, for example, an organic peroxide. Particular examples of the organic peroxides include alkyl peroxides, such as di-t-butyl peroxide, 2,5-dimethyl-2,5-di-t-butylperoxy-hexyne-3 and diisopropyl peroxide; aryl peroxides, such as dicumyl peroxide; acyl peroxides, such as lauroyl peroxide; aroyl peroxides, such as dibenzoyl peroxide; ketone peroxides, such as methyl ethyl ketone peroxide and cyclohexanone peroxide; hydroperoxides, such as t-butyl peroxide and cumene hydroperoxide; peroxy carbons; and peroxy carboxylates. These polymerization initiators can be used singly or in combination of two or more kinds. The polymerization initiator is used in an amount of usually about 0.01 to 1 part by weight based on 100 parts by weight of the 4-methyl-1-pentene polymer.

Examples of the solvents include aliphatic hydrocarbons, such as hexane, heptane, octane, decane, dodecane and tetradecane; alicyclic hydrocarbons, such as methylcyclopentane, cyclohexane, methylcyclohexane, cyclooctane and cyclodecane; aromatic hydrocarbons, such as benzene, toluene, xylene, ethylbenzene, cumene, ethyltoluene, trimethylbenzene, cymene and diisopropylbenzene; halogenated hydrocarbons, such as chlorobenzene, bromobenzene, o-dichlorobenzene, carbon tetrachloride, trichloroethane, trichloroethylene, tetrachloroethane and tetrachloroethylene; and kerosine that is a mixture of aliphatic hydrocarbons. These solvents can be used singly or in combination of two or more kinds. The solvent is used in an amount of usually about 100 to 5,000 parts by weight based on 100 parts by weight of the 4-methyl-1-pentene polymer.

Adhesive Resin Composition (B')

The adhesive resin composition (B') for use in the invention is a composition consisting of at least two different resins. There is no specific limitation on the adhesive resin composition, and any composition is employable as far as the layer of the 4-methyl-1-pentene polymer (A') and the layer of the later-described olefin polymer (C') can be bonded with the adhesive resin composition (B'), but preferable is any of the following resin compositions (I) to (III).

(I) A resin composition comprising a 4-methyl-1-pentene polymer (b-1) and a 1-butene polymer (b-2).

It is preferable that the resin composition (I) contains the 4-methyl-1-pentene polymer (b-1) in an amount of 40 to 97.5 parts by weight and the 1-butene polymer (b-2) in an amount of 2.5 to 60 parts by weight, the total amount of said components (b-1) and (b-2) being 100 parts by weight.

(II) A resin composition comprising a 4-methyl-1-pentene polymer (b-1), 1-butene polymer (b-2) and a propylene polymer (b-3).

It is preferable that the resin composition (II) contains the 4-methyl-1-pentene polymer (b-1) in an amount of 40 to 97.5 parts by weight and the 1-butene polymer (b-2) in an amount of 2.5 to 60 parts by weight, the total amount of said components (b-1) and (b-2) being 100 parts by weight, and contains the propylene polymer (b-3) in an amount of 1 to 100 parts by weight based on 100 parts by weight of the total amount of the components (b-1) and (b-2).

When the adhesive resin composition (B') is the resin composition (I) or (II), the layer made of the olefin polymer (C') is preferably a layer made of a propylene polymer (c-4).

(III) A resin composition comprising a 4-methyl-1-pentene polymer (b-1), a 1-butene polymer (b-2), an ethylene/butene copolymer (b-4), and optionally, a propylene/butene copolymer (b-5).

It is preferable that the resin composition (III) contains the 4-methyl-1-pentene polymer (b-1) in an amount of 20 to 60 parts by weight, the 1-butene polymer (b-2) in an amount of 5 to 40 parts by weight, the ethylene/butene copolymer (b-4) in an amount of 30 to 60 parts by weight and the propylene/butene copolymer (b-5) in an amount of 0 to 30 parts by weight, the total amount of said components (b-1), (b-2), (b-4) and (b-5) being 100 parts by weight.

When the adhesive resin composition (B') is the resin composition (III), the layer made of the olefin polymer (C') is preferably a layer made of an ethylene polymer (c-5).

Examples of the 4-methyl-1-pentene polymers (b-1) employable for forming the resin compositions (I) to (III) include those previously described with respect to the 4-methyl-1-pentene polymer (b-1) for forming the adhesive resin composition (B).

Examples of the 1-butene polymers (b-2) employable for forming the resin compositions (I) and (II) include those previously described with respect to the 1-butene polymer (b-2) for forming the adhesive resin composition (B).

Examples of the propylene polymers (b-3) employable for forming the resin composition (II) include those previously described with respect to the propylene polymer (c-1) for forming the propylene polymer composition (C).

The propylene polymer (b-3) desirably has MFR, as measured under the conditions of a temperature of 230° C. and a load of 2.16 kg in accordance with the method of ASTM D1238, of 0.01 to 100 g/10 min, preferably 0.1 to 50 g/10 min. When MFR of the propylene polymer (b-3) is in the above range, the propylene polymer (b-3) shows good blending properties with other resins for forming the resin composition.

The ethylene/butene copolymer (b-4) for forming the resin composition (III) is a copolymer containing constituent units derived from ethylene in amounts of not less than 60% by weight, preferably not less than 80% by weight.

The ethylene/butene copolymer (b-4) desirably has MFR, as measured under the conditions of a temperature of 190° C. and a load of 2.16 kg in accordance with the method of ASTM D1238, of 0.01 to 100 g/10 min, preferably 0.1 to 50 g/10 min. When MFR of the ethylene/butene copolymer (b-4) is in the above range, the copolymer (b-4) shows good blending properties with other resins for forming the resin composition, and hence the adhesive resin composition (B') exhibits high adhesion properties.

The propylene/butene copolymer (b-5) for forming the resin composition (III) is a copolymer containing constituent units derived from propylene in amounts of not less than 60% by weight, preferably not less than 80% by weight.

The propylene/butene copolymer (b-5) desirably has MFR, as measured under the conditions of a temperature of 190° C. and a load of 2.16 kg in accordance with the method of ASTM D1238, of 0.01 to 100 g/10 min, preferably 0.1 to 50 g/10 min. When MFR of the propylene/butene copolymer (b-5) is in the above range, the copolymer (b-5) shows good blending properties with other resins for forming the resin composition, and hence the adhesive resin composition (B') exhibits high adhesion properties.

The resin compositions (I) to (III) can be prepared by melt kneading the 4-methyl-1-pentene polymer (b-1) with other resins by a conventional method. For example, the 4-methyl-1-pentene polymer (b-1) and other resins in given amounts are mixed by a V-type blender, a ribbon blender, a Henschel mixer, a tumbling blender or the like. Then, the mixture is melt kneaded by a single screw extruder, a multiple screw extruder or the like and granulated, or the mixture is melt kneaded by a kneader, a Banbury mixer or the like and pulverized.

The intermediate layer made of any of the above resin compositions can firmly adhere to the surface layer made of the 4-methyl-1-pentene polymer (A') or the olefin polymer (C').

Olefin Polymer (C')

Examples of the olefin polymers (C') include an ethylene polymer (c-5), such as polyethylene, an ethylene/α-olefin copolymer or an ethylene/α-olefin/nonconjugated polyene copolymer, a propylene polymer (c-4), such as polypropylene, a propylene/α-olefin copolymer, block polypropylene or random polypropylene, and a butene polymer, such as poly-1-butene or a 1-butene copolymer.

The propylene polymer (c-4) is particularly preferably polypropylene, a copolymer of propylene and not more than 30% by mol of ethylene, or a copolymer of propylene and not more than 30% by mol of an α-olefin of 4 to 12 carbon atoms. The copolymers may be each a block copolymer or a random copolymer. The crystallinity of the propylene polymer, as measured by X-ray diffractometry, is preferably not less than 30%.

The ethylene polymer (c-5) is particularly preferably polyethylene, or a copolymer of ethylene and not more than 30% by mol of an α-olefin of 3 or more carbon atoms. The ethylene polymer includes linear low-density polyethylene, high-density polyethylene and high-pressure low-density polyethylene. The crystallinity of the ethylene polymer, as measured by X-ray diffractometry, is preferably not less than 30%.

Compounding Additives

The resins for forming the poly-4-methyl-1-pentene resin laminate of the invention may contain an inorganic filler. Examples of the inorganic fillers include powder fillers, such as natural silicic acid or silicates (specifically, powdered talc, kaolinite, calcined clay, pyrophyllite, sericite and wollastonite), carbonates (specifically, precipitated calcium carbonate, heavy calcium carbonate and magnesium carbonate), hydroxides, (specifically, aluminum hydroxide and magnesium hydroxide), oxides (specifically, zinc oxide, zinc white and magnesium oxide), and synthetic silicic acid or silicates (specifically, hydrated calcium silicate, hydrated aluminum silicate, hydrated silicic acid and silicic anhydride); flaky fillers, such as mica; fibrous fillers, such as basic magnesium sulfate whisker, calcium titanate whisker, aluminum borate whisker, sepiolite, PMF (processed mineral fiber), xonotlite, potassium titanate and ellestadite; and balloon fillers, such as glass balloon and fly ash balloon.

In addition to the inorganic fillers, organic fillers such as high styrenes, lignins and reclaimed rubber may be used.

As the inorganic filler, powdered talc is particularly preferable, and it is desirable to use powdered talc having an average particle diameter of 0.2 to 3 μm, preferably 0.2 to 2.5 μm. In the powdered talc, the content of particles having diameters of not less than 5 μm is desirably not more than 10% by weight, preferably not more than 8% by weight. The particle diameter of the powdered talc can be measured by a liquid phase precipitation method.

As the powdered talc, talc having an average aspect ratio (aspect ratio: ratio of the longitudinal or lateral length to the thickness) of not less than 3, particularly not less than 4, is preferably employed.

The inorganic filler, particularly powdered talc, may be untreated one or one having been previously subjected to a surface treatment. Examples of the surface treatments include chemical and physical treatments using agents such as silane coupling agents, higher fatty acids, metallic salts of fatty acids, unsaturated organic acids, organic titanates, resin acids and polyethylene glycol.

The resins for forming the poly-4-methyl-1-pentene resin laminate of the invention may further contain compounding additives in amounts not detrimental to the objects of the invention. Examples of such additives include antioxidants, such as phenolic antioxidants, sulfur type antioxidants and phosphorus type antioxidants, nucleating agents, such as aluminum salts of aromatic carboxylic acids, salts of aromatic phosphoric esters and dibenzylidenesorbitol, heat stabilizers, ultraviolet light absorbers, lubricants, anti-blocking agents, antistatic agents, flame retardants, pigments, dyes, dispersants, copper inhibitors, neutralizing agents, foaming agents, plasticizers, bubble inhibitors, crosslinking agents, peroxides, flow improvers, light stabilizers, weld strength improvers, and anti-fogging agents.

Examples of the phenolic antioxidants include phenols, such as 2,6-di-tert-butyl-p-cresol and stearyl(3,3-dimethyl-4-hydroxybenzyl) thioglycolate; and carbonic acid oligoesters of polyphenols, such as carbonic acid oligoester of 4,4'-butylidenebis(2-tert-butyl-5-methylphenol) (degree of polymerization: 2, 3, 4, 5, 6, 7, 8, 9, 10, etc.).

An example of the sulfur type antioxidant is dialkyl thiodipropionate.

An example of the phosphorus type antioxidant is triphenyl phosphite.

A complex represented by the formula $M_xAl_y(OH)_{2x+3y-2z}(A)_z \cdot aH_2O$ (wherein M is Mg, Ca or Zn, A is an anion other than a hydroxyl group, x, y and z are each a positive number, and a is 0 or a positive number) can be added as, for example, a hydrochloric acid absorbent.

An example of the light stabilizer is 2-hydroxy-4-methoxybenzophenone.

Examples of the lubricants include paraffin wax, polyethylene wax and calcium stearate.

These additives can be used in amounts of 0.0001 to 10 parts by weight based on 100 parts by weight of the resins for forming the poly-4-methyl-1-pentene resin laminate. When the above additives are added to the resins for forming the poly-4-methyl-1-pentene resin laminate, a laminate further improved in property balance, endurance, paintability, printability, scratch resistance and moldability can be obtained.

The above-mentioned various compounding additives can be incorporated into the resins for forming the poly-4-methyl-1-pentene resin laminate by introducing the additives simultaneously or successively into a Henschel mixer, a V-type blender, a tumbling blender, a ribbon blender or the like, mixing them with the resins and then melt kneading the mixture by a single screw extruder, a multiple screw extruder, a kneader, a Banbury mixer or the like.

A kneading device exhibiting excellent kneading performance, such as a multiple screw extruder, a kneader or a Banbury mixer, is preferably employed because the additives can be more homogeneously dispersed.

Laminate

The poly-4-methyl-1-pentene resin laminate of the invention is constituted of a layer of the 4-methyl-1-pentene polymer (A'), an intermediate layer of the adhesive resin composition (B') and a layer of the olefin polymer (C').

There is no specific limitation on the thickness of each layer for forming the laminate, and the thickness thereof is appropriately determined according to the desired oxygen permeability, carbon dioxide permeability and water vapor permeability.

The thickness ratio between the layer of the 4-methyl-1-pentene polymer (A'), the intermediate layer of the adhesive resin composition (B') and the layer of the olefin polymer (C') is usually 1–100:1–100:1–100, preferably 50–100:1–50:1–50.

Likewise, there is no specific limitation on the thickness of the laminate, and the thickness thereof can be appropriately determined according to the shape, size and use application of the laminate. The thickness of the laminate is in the range of usually about 0.01 to 3 mm, preferably about 0.02 to 0.5 mm.

The poly-4-methyl-1-pentene resin laminate of the invention can be prepared by, for example, co-extrusion molding (e.g., T-die casting or water cooling inflation) of the 4-methyl-1-pentene polymer (A'), the adhesive resin composition (B') and the olefin polymer (C'), or press molding of sheets or films produced in advance from the resins by press molding, extrusion molding or the like.

The 4-methyl-1-pentene polymer is a resin having an extremely high gas permeability, so that if the 4-methyl-1-pentene polymer layer is laminated to a layer of the olefin polymer having a low gas permeability and the thickness of each layer is adjusted, the gas permeability such as oxygen permeability, carbon dioxide permeability and water vapor permeability of the resulting laminate can be controlled over a wider range than before. Further, by the use of the olefin polymer having a low melting point as the surface layer, the laminate can be imparted with heat sealing properties.

Packaging Medium

The packaging medium according to the invention comprises the poly-4-methyl-1-pentene resin laminate mentioned above, and can take various forms such as film, sheet, bag, bottle, can, box and tube. When the packaging medium is a film or a bag, the thickness of the packaging medium is in the range of usually 20 to 100 $\mu$m, preferably 30 to 50 $\mu$m. When the packaging medium is a bottle, a can, a box or a tubular container, the thickness of the packaging medium is in the range of usually 0.2 to 3 mm, preferably 0.5 to 2 mm. In order to control the gas permeability, the thickness of the packaging medium can be partly changed.

A part of a container can be formed from a film made of the poly-4-methyl-1-pentene resin laminate.

The packaging medium of the invention can be prepared by a conventional method without specific limitation.

In the method for keeping freshness of vegetables and fruits according to the invention, the vegetables and fruits are wrapped with the above packaging medium. Examples of vegetables and fruits whose freshness can be kept by the method of the invention include:

fruits, such as apricot, avocado, fig, strawberry, blackberry, blueberry, cranberry, dew berry, gooseberry, loganblackberry, raspberry (black), raspberry (red), persimmon, chestnut, coconut, cherry, watermelon, pear, pineapple (green), pineapple (full-ripe), banana, papaya, plum, quince, mango, melon (cantaloupe), melon (honeydew), peach and apple; and vegetables, such as asparagus, kidney bean, lima bean, okra, turnip, autumn squash, cauliflower, cabbage, Brussels sprouts, cucumber, green peas, kale, sweet potato, potato, sweet corn, pop corn, celery, radish, onion, pepper (green pepper), pepper (red pepper, dried), tomato, egg plant, garlic, carrot (foliaged), carrot (root), spinach, broccoli, mushroom, rhubarb, lettuce and vegetable seeds.

The method for keeping freshness according to the invention can keep freshness of cut vegetables, and examples of the cut vegetables include carrot (dice, random cut, ginkgo leaf shape, stick, coin cut, long thin strip), potato (dice, random cut, long thin strip, stick), cabbage (square cut, long thin strip), radish (ginkgo leaf shape, stick, long thin strip), onion (dice, random cut, round slice, slice), cucumber (stick, slice), celery (stick), sweet pepper (half cut, ¼ cut, round slice, long thin strip), lettuce (square cut, ¼ cut, slice), spinach (boiled, fresh), asparagus (boiled, fresh), broad bean (hulled), green peas (hulled), green soybean (boiled), spring onion (slice for relish, oblique cut, long thin strip), Nanking shallot (for relish), sunny lettuce (leaf), parsley (leaf), egg plant (½ cut, ¼ cut), sweet potato (slice), pumpkin (slice, random cut), red carrot (round slice), red cabbage (long thin strips), green pepper, kidney bean, lotus, burdock (round slice, long thin strip), and mixtures thereof.

The poly-4-methyl-1-pentene resin laminate according the invention can control gas permeability over a wide range of high permeability to low permeability.

By the use of the packaging medium comprising the poly-4-methyl-1-pentene resin laminate according to the invention, freshness of vegetables and fruits can be kept for a long period of time.

EXAMPLE

The present invention is further described with reference to the following examples, but it should be construed that the invention is in no way limited to those examples.

In the examples, properties were measured in the following manner.

Melt Flow Rate (MFR)

The melt flow rate of a 4-methyl-1-pentene polymer was measured under the conditions of a temperature of 260° C. and a load of 5 kg, the melt flow rate of a propylene polymer was measured under the conditions of a temperature of 230° C. and a load of 2.16 kg, and the melt flow rate of other resins was measured under the conditions of a temperature of 190° C. and a load of 2.16 kg, in accordance with the method of ASTM D1238.

Oxygen Permeability

The oxygen permeability was measured By a measuring device of OX-TRAN (manufactured by Modern Control Co.) under the conditions of a temperature of 23° C. and a humidity of 0%. Specifically, an oxygen permeability V (cc/m$^2$·24 hr·atm) of a (three-layer) film was measured, and using the measured value, an oxygen permeability constant k (cc·mm/m²·24 hr·atm), that is an oxygen permeability per 1 mm (thickness) of the (three-layer) film, was calculated.

Between V and k, there is a relationship represented by the formula k=d·V/1,000 (wherein d is a thickness ($\mu$m) of the film).

Measurement of Adhesion Strength

A three-layer film was subjected to a T-peel test under the conditions of a peel rate of 300 mm/min, a peel width of 15 mm and a temperature of 23° C.

Freshness Keeping Test

Changes in appearance and color of vegetables and fruits were visually observed every day at a temperature of 25° C., and freshness of the vegetables and fruits was evaluated based on the following criteria.

AA: good
BB: slightly bad
CC: bad

Example 1

A 4-methyl-1-pentene polymer (A-1) (trade name: TPX RT18, available from Mitsui Petrochemical Industries, Ltd.) having a melting point of 237° C., MFR of 25 g/10 min and a density of 0.835 g/cm³ (ASTM D 1505) was used as the 4-methyl-1-pentene polymer.

An adhesive resin composition (B-1) obtained by mixing 60 parts by weight of a 4-methyl-1-pentene polymer (1-octadecene content: 6% by weight, MFR: 3.0 g/10 min), 40 parts by weight of a 1-butene polymer (ethylene content: 5% by weight, MFR: 2.5 g/10 min), 0.10 part by weight of 3,9-bis[2-{3-(3-tert-butyl-4-hydroxy-5-methylphenyl)propionyloxy}-1,1-dimethylethyl]2,4,8,10-tetrakis-spiro[5,5]undecane (trade name: Sumilizer GA80, available from Sumitomo Chemical Co. Ltd.) as a stabilizer, 0.20 part by weight of penta(erythrityl-tetra-β-mercaptonyl)propionate (trade name: Sienox 412S, available from Sipro Kasei K.K.) and 0.03 part by weight of calcium stearate (available from Sankyo Yukigosei K.K.) by a Henschel mixer at a low rotational speed for 3 minutes and extruding the mixture by a twin-screw extruder at a temperature of 280° C. was used as the adhesive resin composition.

A propylene polymer composition (C-1) obtained by extruding a mixture of 60 parts by weight of polypropylene (trade name: F-600, available from Grand Polymer K.K.) having MFR of 10 g/10 min and a density of 0.91 g/cm³ and 40 parts by weight of a 1-butene polymer (trade name: viewron M3080, available from Mitsui Petrochemical Industries, Ltd.) having MFR of 0.2 g/10 min and a density of 0.890 g/cm³ by a twin-screw extruder at a temperature of 280° C. was used as the propylene polymer composition.

Production of Three-layer Film

A three-layer film (poly-4-methyl-1-pentene resin laminate) consisting of a layer of the 4-methyl-1-pentene polymer (A-1), an intermediate layer of the adhesive resin composition (B-1) and a layer of the propylene polymer composition (C-1) was produced by a co-extrusion T-die extruder. The thickness ratio between the layers of the film was 80 $\mu$m/10 $\mu$m/10 $\mu$m ((A-1)/(B-1)/(C-1)).

Example 2

A three-layer film was produced in the same manner as in Example 1, except that a propylene polymer composition (C-2) obtained by extruding a mixture of 80 parts by weight of polypropylene (trade name: F-600, available from Grand Polymer K.K.) having MFR of 10 g/10 min and a density of 0.91 g/cm³ and 20 parts by weight of a 1-butene polymer (trade name: Viewron M3080, available from Mitsui Petrochemical Industries, Ltd.) having MFR of 0.2 g/10 min and a density of 0.890 g/cm³ by a twin-screw extruder at a temperature of 280° C. was used in place of the propylene polymer composition (C-1). The thickness ratio between the layers of the film was 80 $\mu$m/10 $\mu$m/10 $\mu$m ((A-1)/(B-1)/(C-2)).

Example 3

A three-layer film was produced in the same manner as in Example 1, except that a propylene polymer composition (C-3) obtained by extruding a mixture of 60 parts by weight of polypropylene (trade name: F-600, available from Grand Polymer K.K.) having MFR of 10 g/10 min and a density of 0.91 g/cm³ and 40 parts by weight of a propylene/ethylene copolymer having MFR of 0.2 g/10 min and a density of 0.890 g/cm³ by a twin-screw extruder at a temperature of 280° C. was used in place of the propylene polymer composition (C-1). The thickness ratio between the layers of the film was 80 $\mu$m/10 $\mu$m/10 $\mu$m ((A-1)/(B-1)/(C-3)).

Example 4

A three-layer film was produced in the same manner as in Example 1, except that a propylene polymer composition (C-4) obtained by extruding a mixture of 80 parts by weight of polypropylene (trade name: F-600, available from Grand Polymer K.K.) having MFR of 10 g/10 min and a density of 0.91 g/cm³ and 20 parts by weight of a propylene/ethylene copolymer having MFR of 0.2 g/10 min and a density of 0.890 g/cm³ by a twin-screw extruder at a temperature of 280° C. was used in place of the propylene polymer composition (C-1). The thickness ratio between the layers of the film was 80 $\mu$m/10 $\mu$m/10 $\mu$m ((A-1)/(B-1)/(C-4)).

Comparative Example 1

A three-layer film was produced in the same manner as in Example 1, except that polypropylene (C-5) (trade name: F-600, available from Grand Polymer K.K.) having MFR of 10 g/10 min and a density of 0.91 g/cm³ was used singly in place of the propylene polymer composition (C-1). The thickness ratio between the layers of the film was 80 $\mu$m/10 $\mu$m/10 $\mu$m ((A-1)/(B-1)/(C-5)).

Comparative Example 2

A three-layer film was produced in the same manner as in Example 1, except that a propylene polymer composition (C-6) obtained by extruding a mixture of 40 parts by weight of polypropylene (trade name: F-600, available from Grand Polymer K.K.) having MFR of 10 g/10 min and a density of 0.91 g/cm³ and 60 parts by weight of a propylene/ethylene copolymer having MFR of 0.2 g/10 min and a density of 0.890 g/cm³ by a twin-screw extruder at a temperature of 280° C. was used in place of the propylene polymer composition (C-1). The thickness ratio between the layers of the film was 80 $\mu$m/10 $\mu$m/10 $\mu$m ((A-1)/(B-1)/(C-6)).

Comparative Example 3

A three-layer film was produced in the same manner as in Example 1, except that a propylene polymer composition (C-7) obtained by extruding a mixture of 40 parts by weight of polypropylene (trade name: F-600, available from Grand Polymer K.K.) having MFR of 10 g/10 min and a density of 0.91 g/cm³ and 60 parts by weight of a 1-butene polymer having MFR of 0.2 g/10 min and a density of 0.890 g/cm³ by a twin-screw extruder at a temperature of 280° C. was used in place of the propylene polymer composition (C-1). The thickness ratio between the layers of the film was 80 μm/10 μm/10 μm ((A-1)/(B-1)/(C-7)).

Comparative Example 4

A single layer film of the 4-methyl-1-pentene polymer (A-1) was produced by a T-die extruder. The thickness of the film was 100 μm.

Various properties of the films produced in the above examples and comparative examples were measured. The results are set forth in Table 1

TABLE 1

| | | Three layer film | | |
|---|---|---|---|---|
| | Propylene polymer composition | Oxygen permeability *1 | Blocking tendency *2 | Heat sealing properties *3 |
| Ex. 1 | polypropylene/1-butene polymer = 60/40 | 110,000 | no | possible |
| Ex. 2 | polypropylene/i-butene polymer = 80/20 | 95,000 | no | possible |
| Ex. 3 | polypropylene/propylene-ethylene copolymer = 60/40 | 120,000 | no | possible |
| Ex. 4 | polypropylene/propylene ethylene copolymer = 80/20 | 100,000 | no | possible |
| Comp Ex. 1 | polypropylene/ - - - = 100/0 | 80,000 | no | possible |
| Comp Ex. 2 | polypropylene/propylene ethylene copolymer = 40/60 | 160,000 | yes | possible |
| Comp Ex. 3 | polypropylene/1-butene copolymer = 40/60 | 150,000 | yes | possible |
| Comp Ex. 4 | no propylene polymer composition layer | 210,000 | no | impossible |

*1 The oxygen permeability is expressed in cm$^3$/m$^2$ · d · MPa.
*2 Propylene polymer layers superposed upon each other were heated at 120° C. for 30 minutes under a load of 100 g/cm$^2$ to examine whether blocking of the layers took place.
*3 Propylene polymer layers superposed upon each other were heated at 180° C. for 5 seconds under a load of 100 g/cm$^2$ to examine whether heat sealing was possible.

The resins used for forming resin laminates or films in the below-described Examples 5 to 10, Comparative Examples 5 and 6, and Reference Examples 1 to 4 are as follows.

TPX (1): a copolymer of 4-methyl-1-pentene, 1-tetradecene and 1-dodecene, available from Mitsui Chemicals, Inc., trade name: MX021, density: 0.83 g/cm$^3$, MFR: 4 g/10 min, oxygen permeability constant: 1,500 cc·mm/m$^2$·24 hr·atm TPX (2): a copolymer of 4-methyl-1-pentene and 1-decene, available from Mitsui Chemicals, Inc., trade name: DX810, density: 0.83 g/cm$^3$, MFR: 4 g/10 min, oxygen permeability constant: 1,500 cc·mm/m$^2$·24 hr·atm PB: a 1-butene polymer, available from Mitsui Chemicals, Inc., trade name: BL3080, density: 0.89 g/cm$^3$, MFR: 0.2 g/10 min, oxygen permeability constant: 500 cc·mm/m$^2$·24 hr·atm r-PP: a propylene polymer, available from Mitsui Chemicals, Inc., trade name: F327, density: 0.91 g/cm$^3$, MFR: 7 g/10 min, oxygen permeability constant: 100 cc·mm/m$^2$·24 hr·atm PER: a propylene/ethylene copolymer, available from Mitsui Chemicals, Inc., trade name: S4030, density: 0.89 g/cm$^3$, MFR: 0.2 g/10 min, oxygen permeability constant: 240 cc·mm/m$^2$·24 hr·atm TF-A: an ethylene polymer, available from Mitsui Chemicals, Inc., trade name: A4085, density: 0.88 g/cm$^3$, MFR: 3.6 g/10 min, oxygen permeability constant: 510 cc·mm/m$^2$·24 hr·atm TF-XR: a propylene polymer, available from Mitsui Chemicals, Inc., trade name: XR110T, density: 0.89 g/cm$^3$, MFR: 3.2 g/10 min, oxygen permeability constant: 240 cc·mm/m$^2$·24 hr·atm Modified PE (1): maleic acid-modified polyethylene, available from Mitsui Chemicals, Inc., trade name: NE070, density: 0.93 g/cm$^3$, MFR: 1.0 g/10 min, oxygen permeability constant: 250 cc·mm/m$^2$·24 hr·atm Modified PE (2): maleic acid-modified polyethylene, available from Mitsui Chemicals, Inc., trade name: HE040, density: 0.95 g/cm$^3$, MFR: 2.0 g/10 min, oxygen permeability constant: 200 cc·mm/m$^2$·24 hr·atm LLDPE: linear low-density polyethylene, available from Mitsui Chemicals, Inc., trade name: UZ0521L, density: 0.91 g/cm$^3$, MFR: 2.0 g/10 min, oxygen permeability constant: 200 cc·mm/m$^2$·24 hr·atm Example 5

Using the resins and the composition shown in Table 2 as the 4-methyl-1-pentene polymer, the adhesive resin composition and the olefin polymer, a three-layer resin laminate having a thickness of 30 μm (TPX (1)/adhesive resin composition/r-PP=10/10/10 μm) was produced by a film molding machine. The die temperature was 280° C., and the die was set to have a clearance of 0.5 mm. The extrusion temperature of the 4-methyl-1-pentene polymer was 280° C., the extrusion temperature of the adhesive resin composition was 250° C., and the extrusion temperature of the olefin polymer was 220° C. The oxygen permeability of the resin laminate was measured, and the oxygen permeability constant thereof was calculated. Further, the peel strength of the laminate was measured. The results are set forth in Table 2.

The adhesive resin compositions used in Examples 5 to 8 were each prepared in the same manner as in Example 1, except that the components shown in Table 2 were used in the quantity ratio shown in Table 2.

Examples 6–8

A resin laminate was produced in the same manner as in Example 5, except that the resins and the composition shown in Table 2 were used as the 4-methyl-1-pentene polymer, the adhesive resin composition and the olefin polymer. The oxygen permeability of the resin laminate was measured, and the oxygen permeability constant thereof was calculated. Further, the peel strength of the laminate was measured. The results are set forth in Table 2.

Comparative Examples 5, 6

A resin laminate was produced in the same manner as in Example 5, except that the resins shown in Table 2 were used as the 4-methyl-1-pentene polymer and the olefin polymer, and the resin shown in Table 2 was used in place of the adhesive resin composition. The oxygen permeability of the resin laminate was measured, and the oxygen permeability constant thereof was calculated. Further, the peel strength of the laminate was measured. The results are set forth in Table 2.

As shown in Table 2, the oxygen permeability of the layers made of the adhesive resin compositions in the poly-4-methyl-1-pentene resin laminates of the invention is higher than that of the layers made of the hitherto known adhesive resins (e.g., modified polyolefins in the comparative examples), and therefore the poly-4-methyl-1-pentene resin laminates of the invention have higher oxygen permeability as a whole. Accordingly, it can be seen that the poly-4-methyl-1-pentene resin laminates of the invention are suitable as materials of packaging media of vegetables and fruits.

TABLE 2

|  | 4-methyl-1-pentene copolymer | Adhesive resin composition | | Olefin polymer |
|---|---|---|---|---|
|  |  | Components | Weight ratio |  |
| Ex. 5 | TPX(1) | TPX(1)/PB | 90/10 | r-PP |
| Ex. 6 | TPX(1) | TPX(1)/r-PP | 90/10 | r-PP |
| Ex. 7 | TPX(1) | TPX(1)/PB/PER | 55/30/15 | r-PP |
| Ex. 8 | TPX(1) | TPX(2)/PB/TF-A/TF-XR | 30/10/50/10 | LLDPE |
| Comp. Ex. 5 | TPX(1) | modified PE(1) | — | r-PP |
| Comp. Ex. 6 | TPX(1) | modified PE(2) | — | r-PP |

Table 2 (Continued)

| | Oxygen permeability constant ((cc · mm/m² · 24 hr · atm)) | | Adhesion strength (N/15 mm) |
|---|---|---|---|
| | Adhesive resin layer | Resin laminate | |
| Ex. 5 | 1260 | 260 | 3.0 |
| Ex. 6 | 660 | 245 | 2.4 |
| Ex. 7 | 640 | 245 | 2.5 |
| Ex. 8 | 570 | 400 | 0.8 |
| Comp. Ex. 5 | 250 | 200 | 1.5 |
| Comp. Ex. 6 | 240 | 190 | 1.7 |

Reference Example 1

A copolymer of 4-methyl-1-pentene and 1-tetradecene (4-MP/TD copolymer, 4-methyl-1-pentene/1-tetradecene (content ratio by weight)=95/5) was fed to an extruder, heated at 260° C. to melt it, then kneaded and extruded from a T-die to produce a film having a thickness of 50 μm. The oxygen permeability of the film was measured.

Using the film, a bag having a size of about 12×12 cm was produced by a side sealing machine. An asparagus was cut in half and introduced into the bag. Then, the bag was sealed and subjected to a freshness keeping test. The result is set forth in Table 3.

Reference Example 2

Using a resin composition consisting of 90 parts by weight of the 4-MP/TD copolymer and 10 parts by weight of poly-1-butene (trade name: M3080, available from Mitsui Petrochemical Industries, Ltd.), a film having a thickness of 50 λm was produced in the same manner as in Reference Example 1. The oxygen permeability of the film was measured.

A bag was produced in the same manner as in Reference Example 1. About a half the bag was charged with cut cabbage. Then, the bag was sealed and subjected to a freshness keeping test. The result is set forth in Table 3.

Reference Example 3

A freshness keeping test was carried out in the same manner as in Reference Example 1, except that a polyethylene bag (thickness: 30 μm) was used. The result is set forth in Table 3.

Reference Example 4

A freshness keeping test was carried out in the same manner as in Reference Example 2, except that a polyethylene bag (thickness: 30 μm) was used. The result is set forth in Table 3.

TABLE 3

| Packing medium | | Film thickness (μm) | Oxygen permeability V *1 | Odygen permeability constant k *2 |
|---|---|---|---|---|
| 4-MP/TD copolymer (part(s)) | Poly-1-butene (part(s)) | | | |
| Ref. Ex. 1 | 100 | 0 | 50 | 40000 | 2000 |
| Ref. Ex. 2 | 90 | 10 | 50 | 35000 | 1750 |
| Ref. Ex. 3 | Polyethylene | | 30 | 1800 | 54 |
| Ref. Ex. 4 | Polyethylene | | 30 | 1800 | 54 |

4-MP/TD copolymer: 4-methyl-1-pentene/1-tetradecene copolymer
*1 The oxygen permeability is expressed in cc/m² · 24 hr · atm.
*2 The oxygen permeability constant is expressed in cc · mm/m² · 24 hr · atm.

Table 3 (continued)

| | Freshness keeping test Asparaguas | | | | |
|---|---|---|---|---|---|
| | 1 | 2 | 3 | 4 | 5 |
| Ref. Ex. 1 | AA | AA | AA | BB | BB |
| Ref. Ex. 2 |  |  |  |  |  |
| Ref. Ex. 3 | AA | BB | BB | BB | BB |
| Ref. Ex. 4 |  |  |  |  |  |

| | Freshness keeping test Cut cabbage | | | | |
|---|---|---|---|---|---|
| | 1 | 2 | 3 | 4 | 5 |
| Ref. Ex. 1 |  |  |  |  |  |
| Ref. Ex. 2 | AA | AA | AA | AA | AA |
| Ref. Ex. 3 |  |  |  |  |  |
| Ref. Ex. 4 | AA | AA | BB | CC | CC |

What is claimed is:

1. A poly-4-methyl-1-pentene resin laminate comprising:
(I) a layer made of a 4-methyl-1-pentene polymer (A),
(II) an intermediate layer made of an adhesive resin composition (B), and
(III) a layer made of a propylene polymer composition (C) comprising a propylene polymer (c-1) and a 1-butene polymer (c-2) and containing the propylene polymer (c-1) in an amount of 60 to 90 parts by weight and the 1-butene polymer (c-2) in an amount of 10 to 40 parts by weight, the total amount of said components (c-1) and (c-2) being 100 parts by weight.

2. A poly-4-methyl-1-pentene resin laminate comprising:

(I) a layer made of a 4-methyl-1-pentene polymer (A), (II) an intermediate layer made of an adhesive resin composition (B), and (III) a layer made of a propylene polymer composition (C) comprising a propylene polymer (c-1) and a propylene/ethylene copolymer (c-3) and containing the propylene polymer (c-1) in an amount of 60 to 90 parts by weight and the propylene/ethylene copolymer (c-3) in an amount of 10 to 40 parts by weight, the total amount of said components (c-1) and (c-3) being 100 parts by weight.

3. The poly-1-methyl-1-pentene resin laminate as claimed in claim 1, wherein the 4-methyl-1-pentene polymer (A) is a 4-methyl-1-pentene homopolymer or a 4-methyl-1-pentene copolymer containing constituent units derived from 4-methyl-1-pentene in amounts of not less than 85% by weight.

4. The poly-4-methyl-1-pentene resin laminate as claimed in claim 1, wherein the adhesive resin composition (B) is a composition comprising a 4-methyl-1-pentene polymer (b-1) and a 1-butene polymer (b-2) and containing the 4-methyl-1-pentene polymer (b-1) in an amount of 40 to 70 parts by weight and the 1-butene polymer (b-2) in an amount of 30 to 60 parts by weight, the total amount of said components (b-1) and (b-2) being 100 parts by weight.

* * * * *